United States Patent
Yu

[11] Patent Number: 5,971,108
[45] Date of Patent: Oct. 26, 1999

[54] SAFETY DEVICE FOR VERTICALLY MOVING LOAD CARRIER

[76] Inventor: Kuo-Liang Yu, P.O. Box 2103, Taichung, Taiwan

[21] Appl. No.: 09/013,002

[22] Filed: Jan. 26, 1998

[51] Int. Cl.$^6$ .................................................. B66B 11/08
[52] U.S. Cl. ........................................ 187/255; 187/270
[58] Field of Search ............................... 187/255, 254, 187/270, 207, 208; 182/141

[56] References Cited

U.S. PATENT DOCUMENTS 3,693,761  9/1972  Fitzgibbon .............................. 187/255

Primary Examiner—Kenneth W. Noland

[57] ABSTRACT

A safety device for vertically moving load carrier is disclosed. It includes a vertical column, a retainer, a vertical safety rack, a pivot shaft, a safety detent pivotally fitted on the pivot shaft and a resilient member. When a flexible transmission belt disposed in the vertical column is in a normally sealedly installed state, the safety detent is positioned in a first position without contacting with the safety rack. While in case the transmission belt is accidentally broken and in a loosened state, the safety detent is forced by the resilient member and rotated to a second position in contact with the safety rack. In the second position, the engaging section of the safety detent is just engaged with a horizontal section of one tooth of the safety rack so that the retainer and the load carried thereby are kept stationary at a certain height without abruptly dropping down to cause accident.

7 Claims, 4 Drawing Sheets

SAFETY DEVICE FOR VERTICALLY MOVING LOAD CARRIER

BACKGROUND OF THE INVENTION

The present invention relates to a safety device for vertically moving load carrier, including a safety detent and a safety rack. In case the transmission belt is accidentally broken, the safety detent is forced to engage with the safety rack so as to prevent the load carrier from abruptly dropping down to cause accident.

FIGS. 1 and 2 show a conventional vertically moving load carrier often used in a general packing machine, elevator, crane, parking apparatus, etc. Such load carrier basically includes a pair of vertical columns 1 and a retainer 2.

The vertical column 1 has a predetermined height and is disposed with a driving shaft 11 and a driven shaft 12 respectively at top section and bottom section. The driving shaft 11 is driven by a driving means 13. An circular flexible circulating transmission belt 14 (such as a chain, a leather belt or a steel cord) is sealedly disposed between the driving shaft 11 and the driven shaft 12. The driving means 13 can be an electric motor.

The retainer 2 is secured at a predetermined position of the transmission belt 14 and is only vertically slidable along the vertical column 1. The retainer 2 has a load platform 21 for receiving a load 22 (such as an article, person or car). When the driving means 13 drives the driving shaft 11, via the transmission belt 14, the retainer 2 is lifted from a lower first position H1 to a higher second position H2 or is lowered from the second position H2 to the first position H1.

The conventional device has a most serious problem, that is, unsafety. Especially, when the retainer 2 is lifted or lowered, in case the load 22 is too heavy and the transmission belt 14 is accidentally broken apart, the load will abruptly drop down to cause injury or death of persons or damage of articles.

A safety device (not shown) used in the conventional car parking apparatus includes similar vertical column structure. The safety device further includes an upper sprocket, a lower sprocket, a chain and a parking platform. In addition, a vertical dropproof rack is disposed on one side of the vertical column. The parking platform is equipped with a safety detent and an electromagnetic valve near the dropproof rack. Such safety device is operated in such a manner that when the platform goes up, the electromagnetic valve is not energized and the safety detent is moved upward along with the platform one tooth by one tooth in contact with the dropproof rack. When going down, the electromagnetic valve is energized to pull back the safety detent from contacting with the dropproof rack, permitting the parking platform to move downward.

However, the above structure still has two major shortcomings as follows: 1. The parking platform is prevented from accidentally dropping only in rising state. While when moving downward, the safety detent does not contact with the dropproof rack. That is, it has no any security. This is extremely dangerous. 2. When rising, the safety detent keeps in contact with the dropproof rack and is quite subject to abrasion.

SUMMARY OF THE INVENTION

It is therefore a primary object of the present invention to provide a safety device for vertically moving load carrier, including a safety detent and a safety rack. In case the transmission belt is accidentally broken, the safety detent is forced to engage with the safety rack so as to prevent the load carrier from abruptly dropping down and ensure safety of persons and articles.

It is a further object of the present invention to provide the above safety device having simple structure which can be manufactured and installed at low cost while reliably functioning to ensure safety of persons and articles.

The present invention can be best understood through the following description and accompanying drawings, wherein:

DETAILED DESCRIPTION OF THE PREFERRED EMBODIMENTS

Figure 1:
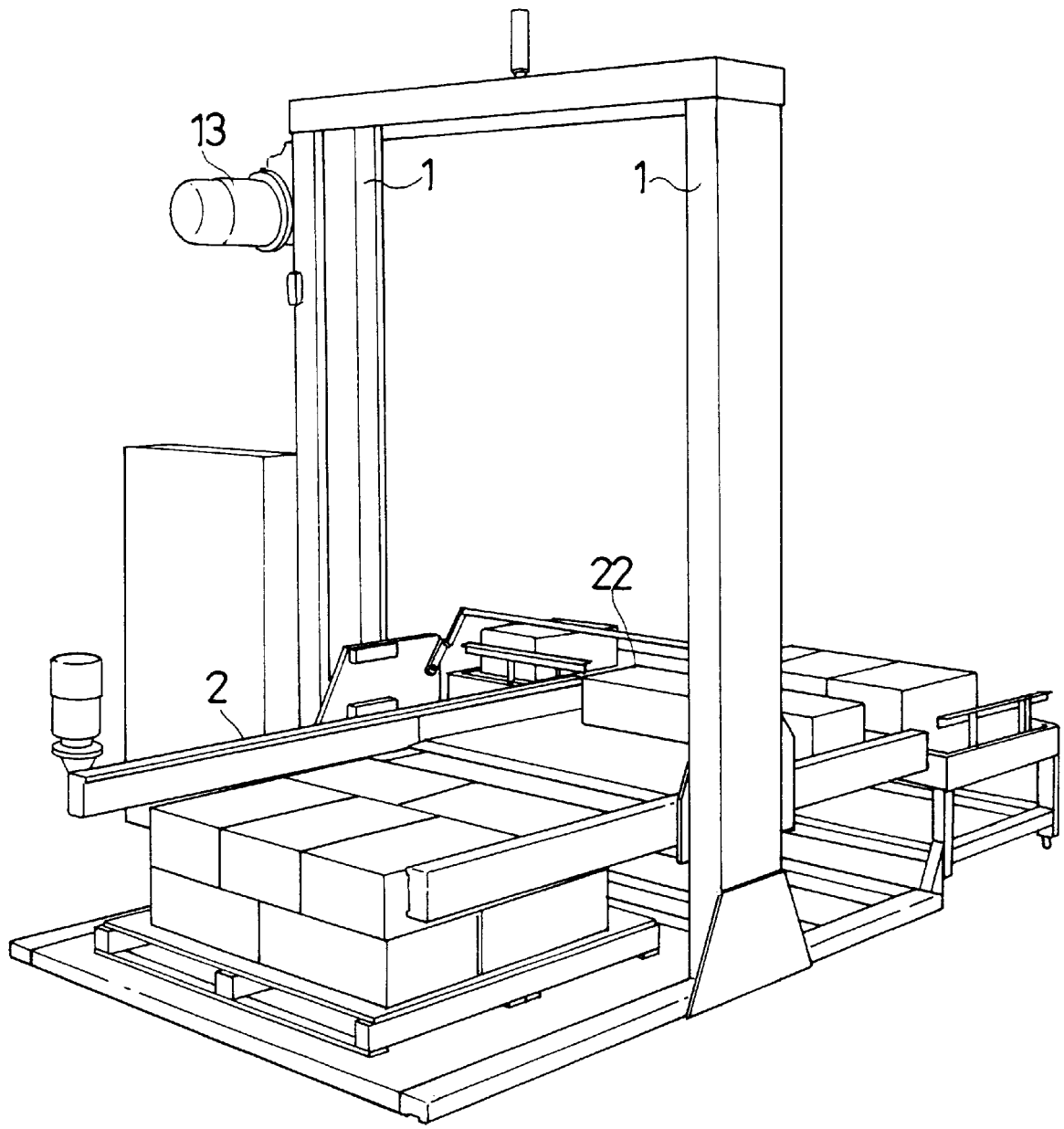
FIG. 1 shows a conventional vertically moving load carrier.
Figure 2:
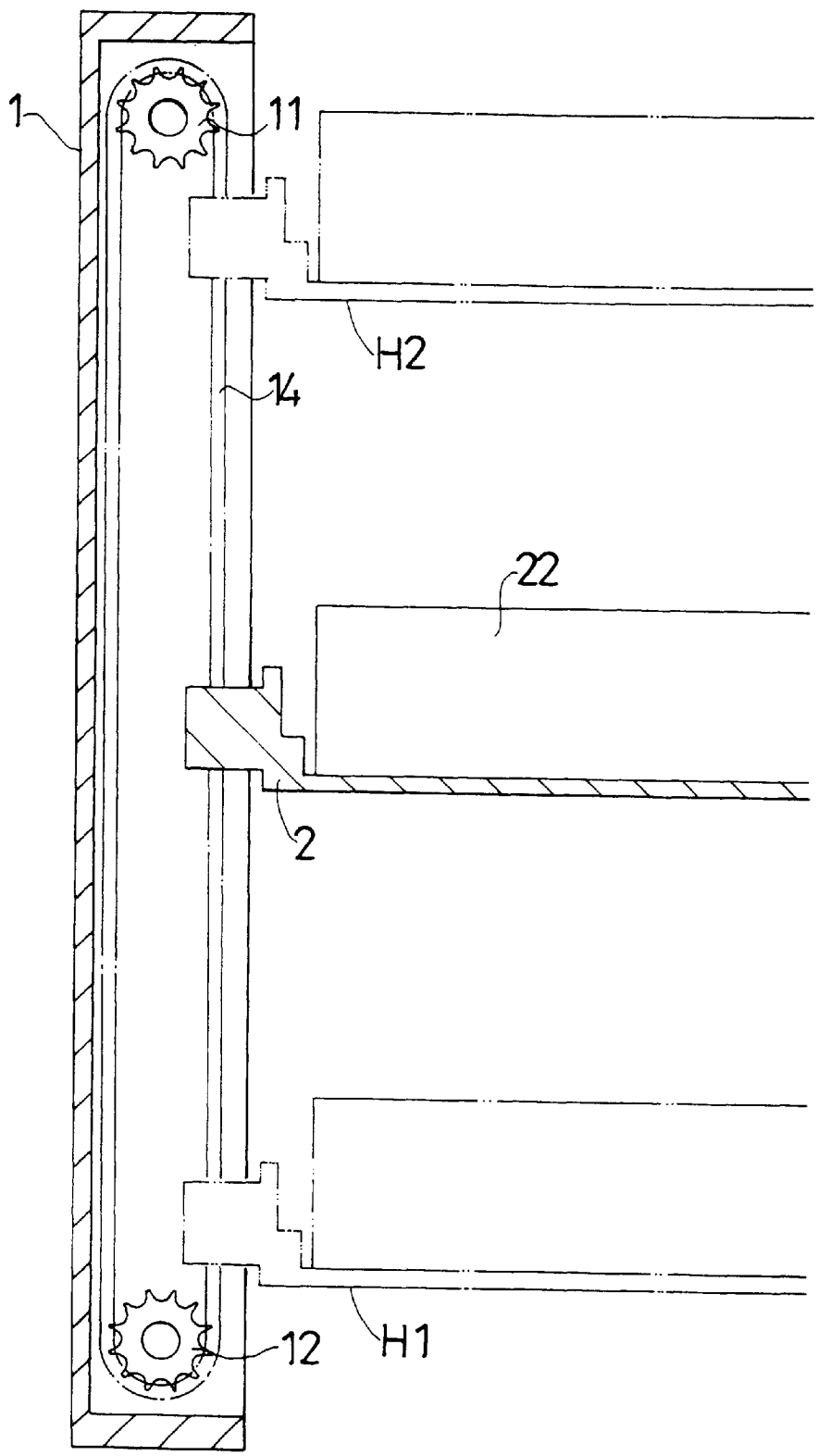
FIG. 2 is a sectional view showing the vertical column of the conventional vertically moving load carrier.
Figure 3:
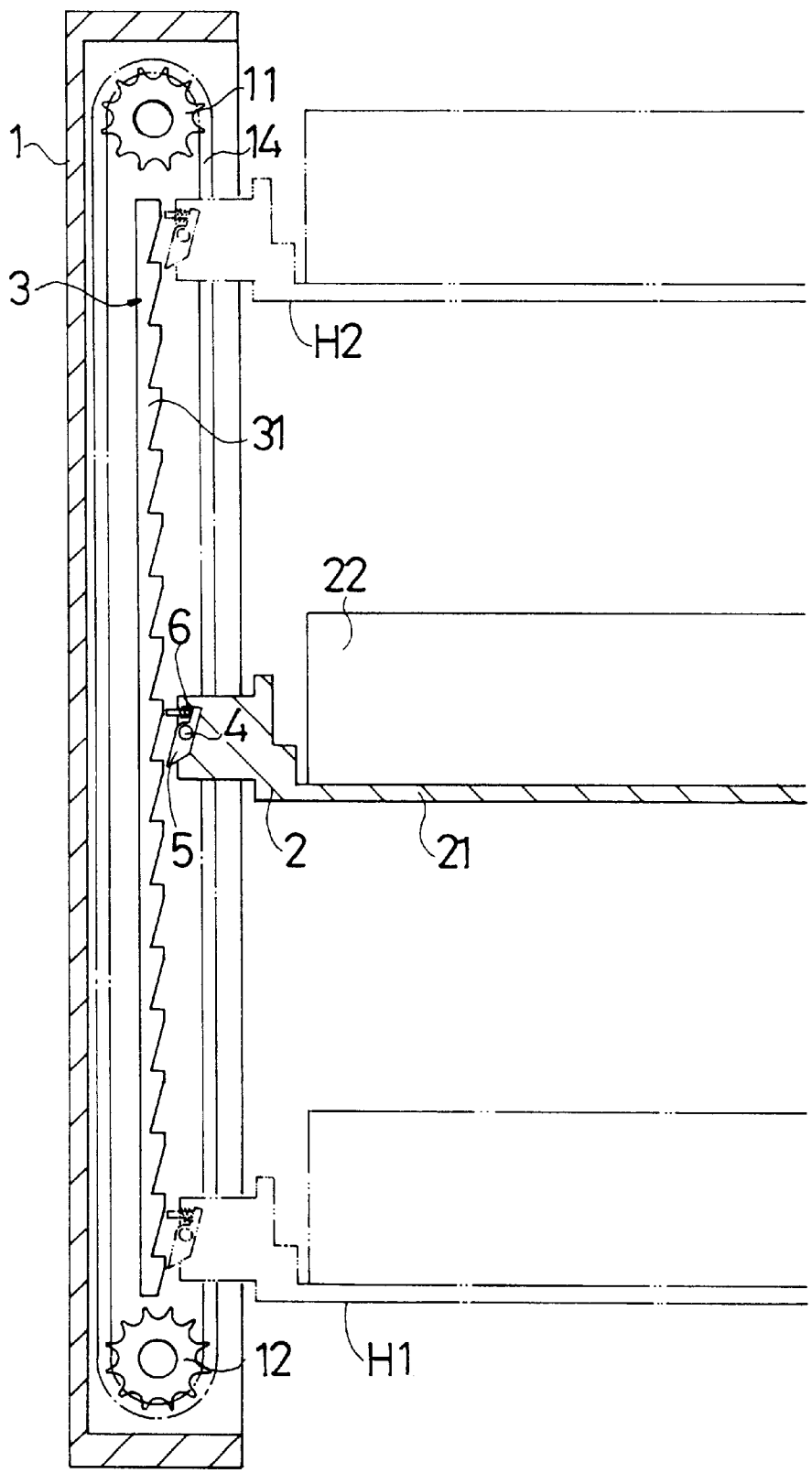
FIG. 3 is a sectional view showing the structure of the present invention.
Figure 4:
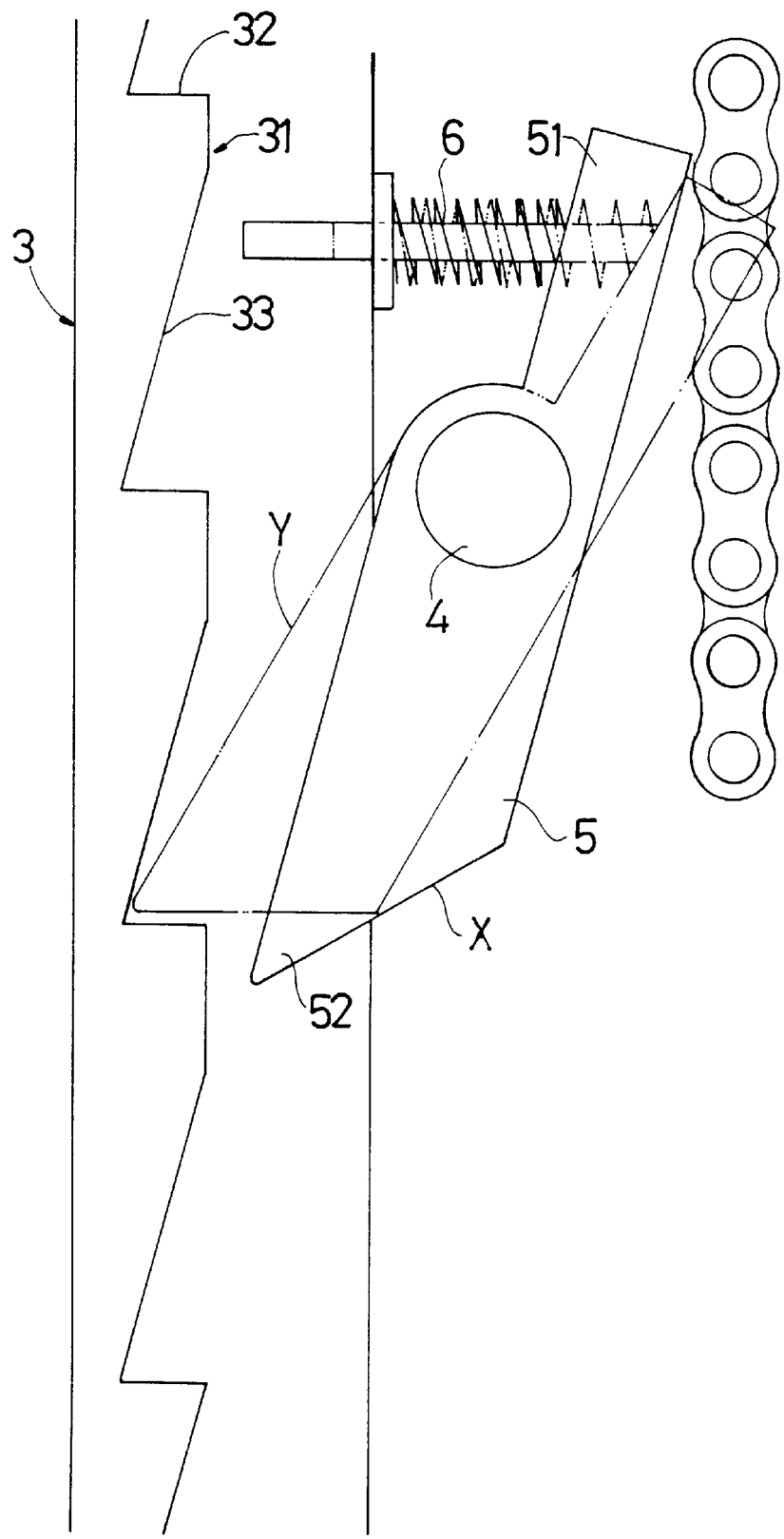
FIG. 4 is an enlarged view showing the safety detent and safety rack of the present invention.

Please refer to FIGS. 3 and 4. The safety device of the present invention includes a vertical column 1, a retainer 2, a safety rack 3, a pivot shaft 4, a safety detent 5 and a resilient member 6.

The vertical column 1 has a predetermined height and is disposed with a driving shaft 11 and a driven shaft 12 respectively at top section and bottom section. The driving shaft 11 is driven by a driving means 13. An circular flexible circulating transmission belt 14 is sealedly disposed between the driving shaft 11 and the driven shaft 12. In this embodiment, the driving means 13 is an electric motor.

The retainer 2 is secured at a predetermined position of the transmission belt 14 and is only vertically slidable along a vertical rail (not shown) of the vertical column 1. The retainer 2 has a load platform 21 for receiving a load 22. When the driving means 13 drives the driving shaft 11, via the transmission belt 14, the retainer 2 is controlled to rise from a lower first height H1 to a higher second height H2 or descend from the second height H2 to the first height H1.

The safety rack 3 is vertically fixedly disposed on the vertical column 1, having multiple teeth 31. Each tooth 31 has a horizontal section 32 at top end and a slope section 33 at bottom end. The safety rack 3 is spaced from the retainer 2 by a predetermined clearance.

The pivot shaft 4 is fixed on the retainer 2 between the transmission belt 14 and the safety rack 3.

The safety detent 5 is pivotally fitted on the pivot shaft 4, having a sensing end 51 proximal to the transmission belt 14 and an engaging end 52 proximal to the safety rack 3.

The resilient member 6 is able to provide a resilient pushing force less than the resilient force of the flexible transmission belt 14. Therefore, under a normal circumstance, the resilient member 6 is in a compressed state with one end fixed on the retainer 2 while the other end abutting against the sensing end 51 of the safety detent 5.

Accordingly, when the transmission belt 14 is in a normally sealedly installed state, that is, the resilient pushing force of the resilient member 6 is less than the resilient force of the transmission belt 14, the safety detent 5 is positioned in a first position X without contacting with the safety rack 3._

However, in case the transmission belt 14 is accidentally broken and in a loosened state, that is, the resilient pushing force of the resilient member 6 is greater than the resilient force of the loosened transmission belt 14, the safety detent 5 is forced by the resilient member 6 and rotated to a second position Y in contact with the safety rack 3. In the second position Y, the engaging section 52 of the safety detent 5 is just engaged with the horizontal section 32 of one tooth 31 of the safety rack 3. Therefore, the retainer 2 and the load 22 carried thereby are kept stationary at a certain height without abruptly dropping down to cause accident.

The above embodiment can be modified without departing from the spirit of the present invention. For example, the flexible transmission belt 14 can be a metal chain, belt or a steel cord. Also, the resilient member 6 can be a spring, a leaf spring or a torque spring.

The present invention has the following advantages:

1. Wide range of application. The present invention is widely applicable to various fields such as packing machine, elevator, crane or parking apparatus.

2. High safety. In case the transmission belt is broken apart, the engaging section 52 of the safety detent 5 can immediately engage with the safety rack 3 to prevent the retainer from dropping down. Therefore, the safety of the load 22 (no matter persons, cars or articles) carried by the platform 21 ) is ensured.

3. Simple and effective structure. The present invention is characterized by the safety rack 3, pivot shaft 4, safety detent 5 and resilient member 6 which are all simple components and can be manufactured and installed at low cost. However, these components reliably function to ensure safety of persons and articles.

It is to be understood that the above description and drawings are only used for illustrating some embodiments of the present invention, not intended to limit the scope thereof. Any variation and derivation from the above description and drawings should be included in the scope of the present invention.

What is claimed is:

1. A safety device for vertically moving load carrier, comprising:

a vertical column having a predetermined height and disposed with a driving shaft and a driven shaft respectively at top section and bottom section, the driving shaft being driven by a driving means, an circular flexible circulating transmission belt being sealedly disposed between the driving shaft and the driven shaft; and a retainer secured at a predetermined position of the transmission belt and only vertically slidable along the vertical column, the retainer having a load platform for receiving a load, whereby when the driving means drives the driving shaft, via the transmission belt, the retainer is controlled to rise from a lower first height to a higher second height or descend from the second height to the first height, said safety device further comprising the improvement in that:

a safety rack vertically fixedly disposed on the vertical column and having multiple teeth, each tooth having a horizontal section at top end and a slope section at bottom end, the safety rack being spaced from the retainer by a predetermined clearance;

a pivot shaft fixed on the retainer between the transmission belt and the safety rack;

a safety detent pivotally fitted on the pivot shaft and having a sensing end proximal to the transmission belt and an engaging end proximal to the safety rack; and a resilient member serving to provide a resilient pushing force less than the resilient force of the flexible transmission belt in a normal state, one end of the resilient member being fixed on the retainer, while the other end thereof abutting against the sensing end of the safety detent, so that when the transmission belt is in a normally sealedly installed state, the safety detent is positioned in a first position without contacting with the safety rack, while in case the transmission belt is accidentally broken and in a loosened state, the safety detent is forced by the resilient member and rotated to a second position in contact with the safety rack, in the second position, the engaging section of the safety detent being right engaged with the horizontal section of one tooth of the safety rack so that the retainer and the load carried thereby are kept stationary at a certain height without abruptly dropping down to cause accident.

2. A safety device as claimed in claim 1, wherein the flexible transmission belt is a metal chain.

3. A safety device as claimed in claim 1, wherein the flexible transmission belt is a leather belt.

4. A safety device as claimed in claim 1, wherein the flexible transmission belt is a steel cord.

5. A safety device as claimed in claim 1, wherein the resilient member is a spring.

6. A safety device as claimed in claim 1, wherein the resilient member is a leaf spring.

7. A safety device as claimed in claim 1, wherein the resilient member is a torque spring.

* * * * *